(12) United States Patent
Mericle (10) Patent No.: US 9,415,787 B2
(45) Date of Patent: Aug. 16, 2016

(54) EXTERNAL FRAME SYSTEM AND METHOD FOR MOUNTING

(71) Applicant: David Shane Mericle, Buda, TX (US)

(72) Inventor: David Shane Mericle, Buda, TX (US)

( * ) Notice: Subject to any disclaimer, the term of this patent is extended or adjusted under 35 U.S.C. 154(b) by 0 days.

(21) Appl. No.: 14/625,677

(22) Filed: Feb. 19, 2015

(65) Prior Publication Data

US 2015/0239484 A1 Aug. 27, 2015

Related U.S. Application Data

(60) Provisional application No. 61/945,642, filed on Feb. 27, 2014.

(51) Int. Cl.
| | |
|---|---|
| *B62B 3/10* | (2006.01) |
| *B62B 3/02* | (2006.01) |
| *B62B 5/00* | (2006.01) |
| B62B 5/06 | (2006.01) |
| B62B 3/00 | (2006.01) |

(52) U.S. Cl.
CPC .............. *B62B 3/02* (2013.01); *B62B 5/0086* (2013.01); *B62B 3/007* (2013.01); *B62B 5/067* (2013.01); *B62B 2204/06* (2013.01); *B62B 2205/10* (2013.01); *B62B 2205/104* (2013.01); *B62B 2207/00* (2013.01); *Y10T 29/49826* (2015.01)

(58) Field of Classification Search
CPC ...... B62B 2204/06; B62B 5/067; B62B 1/20; B62B 1/262
See application file for complete search history.

(56) References Cited

U.S. PATENT DOCUMENTS

| | | | |
|---|---|---|---|
| 217,971 A | 7/1879 | Allen | |
| D31,647 S | 10/1899 | Knowles | |
| 1,103,429 A | 7/1914 | Pitkin | |
| D96,494 S | 8/1935 | Morse | |
| 2,044,363 A | 12/1935 | Morse | |
| 2,040,134 A | 5/1936 | Heller | |
| 2,404,310 A | 7/1946 | McCallick | |
| 2,450,690 A | 10/1948 | Robins | |
| 2,551,040 A * | 5/1951 | Newell | ............. B63C 13/00 114/344 |
| 2,696,990 A * | 12/1954 | Davis | ............. A45C 13/385 280/35 |
| 3,361,441 A * | 1/1968 | McRae | ............. B63C 13/00 280/414.2 |

(Continued)

*Primary Examiner* — Brodie Follman
(74) *Attorney, Agent, or Firm* — Decker Jones P.C.; Brian K. Yost; Geoffrey Mantooth (57) ABSTRACT

A frame for attachment to an article is provided, the frame comprising a crosspiece and an arm, the crosspiece being coupled to the arm and comprising pegs, the pegs being structured and arranged for insertion within an article opening. The arm comprises a distal end for insertion within a second opening of the article. The frame comprises transport members, such as wheels or sliding members, adapted to permit the article and frame to be moved when the frame is attached to the article. The frame may be adapted for attachment to a portable cooler comprising a foot opening and a handle opening, the pegs being adapted for insertion within the foot opening, the arm adapted for insertion within the handle opening. The crosspiece and arm may be adjustable in length. One or more frames may be attached to the portable cooler.

22 Claims, 8 Drawing Sheets

(56) References Cited

U.S. PATENT DOCUMENTS

| | | | |
|---|---|---|---|
| D237,786 S | 11/1975 | Gilster | |
| D261,634 S | 11/1981 | Beshears | |
| 4,392,665 A * | 7/1983 | Miller | B63C 13/00 114/344 |
| 4,583,904 A * | 4/1986 | Maxwell | B62B 1/14 254/131 |
| 4,681,341 A | 7/1987 | Lai | |
| D303,031 S | 8/1989 | Ellis | |
| 4,925,147 A * | 5/1990 | Potter | A47B 97/08 248/166 |
| 4,934,719 A * | 6/1990 | duPont | A47C 1/14 280/30 |
| 4,976,448 A * | 12/1990 | Wickersham | B62B 1/10 280/47.2 |
| 5,092,112 A * | 3/1992 | Buckendorf, Jr. | A01D 34/4167 56/12.7 |
| 5,169,164 A * | 12/1992 | Bradford | B62B 1/20 190/18 A |
| 5,176,394 A | 1/1993 | Veazey | |
| D340,340 S | 10/1993 | Allen | |
| 5,259,215 A | 11/1993 | Rocca | |
| D342,361 S | 12/1993 | Williams et al. | |
| D358,921 S * | 5/1995 | Abbema | D34/24 |
| 5,427,393 A * | 6/1995 | Kriebel | B62B 1/14 280/47.131 |
| 5,433,460 A * | 7/1995 | Young | B62B 5/0083 280/35 |
| D362,529 S | 9/1995 | Hilaire et al. | |
| 5,586,778 A | 12/1996 | Lindh et al. | |
| 5,772,223 A * | 6/1998 | Letourneau | A47C 7/006 280/30 |
| 5,782,600 A * | 7/1998 | Walsh | A47B 91/002 254/15 |
| 5,823,551 A * | 10/1998 | Conroy | B62B 5/0083 280/47.131 |
| 5,971,360 A * | 10/1999 | Sinsley | B66F 15/00 254/131 |
| 6,032,964 A * | 3/2000 | Capobianco | B62B 5/0083 280/414.2 |
| 6,059,299 A * | 5/2000 | Rust | B62B 5/0083 280/47.131 |
| 6,085,503 A | 7/2000 | Hutchinson | |
| 6,109,644 A * | 8/2000 | Cox | B62B 1/20 280/47.24 |
| 6,315,310 B1 * | 11/2001 | Hurt | B62B 1/264 206/373 |
| D465,897 S * | 11/2002 | Smith | B62B 1/20 D34/23 |
| 6,575,481 B1 * | 6/2003 | Davis | A47B 83/02 280/47.17 |
| 6,634,658 B2 | 10/2003 | Larouche | |
| 6,708,993 B2 * | 3/2004 | Feik | B62B 5/0083 280/63 |
| D493,020 S | 7/2004 | Resfum | |
| 7,178,812 B1 * | 2/2007 | Bryan | B62B 1/14 280/248 |
| D550,476 S | 9/2007 | Liu et al. | |
| D554,324 S | 10/2007 | Liao | |
| 7,350,790 B1 * | 4/2008 | Wilson | B60D 1/00 280/402 |
| 7,661,684 B2 * | 2/2010 | Westrate | A01G 23/04 280/47.34 |
| 7,823,370 B1 * | 11/2010 | Wiebe | A01D 34/90 56/12.7 |
| 7,845,670 B2 * | 12/2010 | Oberg | B60D 1/66 280/47.24 |
| D642,351 S | 7/2011 | Bozzo | |
| 8,002,510 B2 * | 8/2011 | Williams | B62B 1/268 24/494 |
| 8,517,401 B1 * | 8/2013 | Horn | B62B 5/0089 280/47.15 |
| 8,690,167 B1 * | 4/2014 | Huntley | B62B 5/0083 280/414.2 |
| D707,008 S * | 6/2014 | Mericle | B62B 1/20 D34/26 |
| 9,033,347 B1 * | 5/2015 | Westrate | B62B 3/02 280/47.12 |
| 9,187,107 B2 * | 11/2015 | Becka | B62B 1/14 |
| 9,199,657 B2 * | 12/2015 | Martin | B62B 5/0083 |
| 9,278,704 B2 * | 3/2016 | Cates | B62B 5/0089 |
| 2002/0089135 A1 * | 7/2002 | Feik | B62B 5/0083 280/63 |
| 2004/0021280 A1 * | 2/2004 | Peggs | B62B 1/125 280/47.24 |
| 2008/0001373 A1 | 1/2008 | Vaughn | |
| 2013/0168933 A1 * | 7/2013 | Watzke | B62B 1/125 280/47.26 |
| 2013/0270795 A1 * | 10/2013 | Tyson | B63C 13/00 280/414.2 |
| 2015/0115555 A1 * | 4/2015 | Cates | B62B 5/0089 280/47.26 |
| 2015/0239484 A1 * | 8/2015 | Mericle | B62B 3/02 280/35 |

* cited by examiner

EXTERNAL FRAME SYSTEM AND METHOD FOR MOUNTING

This application claims the benefit of provisional application Ser. No. 61/945,642 filed Feb. 27, 2014, the contents of which are incorporated by reference herein its entirety.

FIELD OF THE INVENTION

This disclosure relates generally to external frames and methods for mounting external frames to ice chests, boxes, foot lockers and other articles. More particularly, embodiments may be directed to frames useful for removable attachment to ice chests, foot lockers and other articles. Specifically, embodiments may be used to attach wheels to an ice chest or other article.

BACKGROUND OF THE INVENTION

Ice chests are used to keep contents at a desired temperature regardless of the ambient air temperature. Ice chests come in various sizes, which typically range from about 20 quarts up to about 165 quarts. However, the size and configuration of ice chests between manufacturers may vary.

Recently, premium ice chests which have the ability to keep food and other contents cold for longer periods of time have become more common. Examples of premium ice chests include those sold under the trademarks YETI, PELICAN, GRIZZLY, K2, ORCA, and COLEMAN. These premium ice chests are able to keep contents at an ice chest temperature longer than traditional ice chests due to the insulation and construction. Premium ice chests are also designed for more extreme conditions. For example, heavy duty ice chests are generally in demand not only for camping, but for remote operations, oil field operations, deep sea fishing, and the like. A downside to this construction and insulation is the additional weight associated with the heavy duty ice chests.

Although ice chests and other articles have different appearances, all share some common features. For example, ice chests generally have a lid on top for access to the contents, handles on either end, and, at least one drain plug. The size, shape and other characteristics of the lid, handle and drain plug may vary among models and among manufacturers. Another feature commonly found on premium ice chests is rubber or otherwise non-slip feet. These feet keep the ice chest from sliding around on wet sea decks or the back of a pickup truck, and provide some protection for the ice chest in the event of a drop. Embodiments disclosed herein may attach to the feet of an article such as a premium ice chest or may attach to other openings in a surface of the ice chest.

Traditionally, ice chests have been either carried by handles using handles molded into the ice chest or permanently attached to the ice chest. The recent appearance of the premium ice chest market which makes the ice chest significantly more bulky and heavier has made carrying these ice chests by hand unreasonable, especially for longer distances. Carrying a premium ice chest may be difficult even if the ice chest is empty—a fully loaded ice chest can easily be over 100 pounds.

What is needed is a device and method that will permit easy, safe movement of an ice chest or other heavy or cumbersome article.

DESCRIPTION OF THE PRIOR ART

Several means for transporting portable ice chests are described in the prior art. For example, U.S. Pat. No. 5,169,164 to Bradford discloses a tote that may be attached to a portable ice chest and secured in place by straps. U.S. Pat. No. 5,259,215 to Rocca discloses an ice chest comprising a mounting block adapted for selective attachment to an axle portion of a wheel and axle assembly. US Pat. Pub. No. 2008/0001373, Vaughn, discloses an ice chest comprising receptacles on opposing sides of a cooler adapted to receive mounting pins for attachment of a wheel and axle assembly. Unfortunately, such devices are poorly suited for movement of a premium ice chest over long distances in harsh environments. Therefore, there remains a need for an external frame and method of mounting to an ice chest that is secure, easily mountable without tools, which may be coupled to a variety of ice chests and other articles, and which is suitable for use over long distances, through uneven terrain, and in harsh environments.

SUMMARY OF THE INVENTION

Embodiments disclosed herein may attach one or more frames to an ice chest without requiring holes or other modification of the ice chest. Embodiments disclosed herein may be easily attached or detached from an ice chest or other article. Embodiments of a frame may be installed to an ice chest and removed as needed. Embodiments disclosed herein may be more compact than previous approaches to carrying or transporting large, bulky items. Embodiments disclosed herein may further utilize existing features provided by the manufacturer, thus avoiding any need to modify or alter the functionality or durability of the article.

In one embodiment the frame may be attached to the feet of an ice chest using openings in the feet. Attachment to the feet of a premium ice chest may not require drilling into the ice chest or otherwise modifying the ice chest such that the warranty is invalidated or the functionality of the ice chest is affected.

In one embodiment, the frame may include a cross member, one or more pegs, offset member, and an arm. In some embodiments, the frame may further include wheels, an extension member, or attachment points.

Cross member may be manufactured from various materials. Marine grade stainless steel may be advantageous for contact with harsh elements and further be able to support a fully loaded ice chest. Cross member may have any cross-section, including solid or hollow. In some embodiments, a cross section of cross member may be substantially square or otherwise angular. In other embodiments, a cross section of cross member may be substantially circular or otherwise curved. In some embodiments, cross member may further function as an axle. In some embodiments, cross member is manufactured having a set length and pegs are permanently affixed to cross member in predetermined locations to align with features on the article. In other embodiments, cross member has an adjustable length or the position of pegs on cross member may be varied to align with the features on the article.

Pegs on cross member may be useful for engaging the feet on an ice chest. The shape and size of pegs may be selected for engaging the feature of an article without damage to the article or modification to the article. Pegs may be cast, molded, cut, shaped, or otherwise formed for contact with features of an article. In some embodiments, pegs are formed for contact with features, such as openings in feet commonly found on premium ice chests. Pegs may have various profiles or cross-sections for contact. In some embodiments, pegs may have a uniform cross section or profile, or may be substantially uniform with a taper or knurl. In other embodiments, pegs may have a directional cross section. For example, pegs may have a shoulder or other feature for contact with an edge of opening, a head for contact with material inside opening, and may be angled or tapered to avoid contact or to provide specific contact with other portions of material inside opening. The size of pegs may also be selected based on the geometry of pegs or the shape or depth of the feature on the article.

Pegs positioned on cross member may be attached or coupled to features on an ice chest or other article. Cross member having pegs extending radially therefrom may be advanced into openings in feet of an ice chest. Pegs may engage the features on an article to secure the frame to the article. For example, embodiments may utilize openings as pivot points to create friction in the cavity. One method of engaging pegs with the features of the article includes rotating cross member about a longitudinal axis utilizing the edge of an opening as a fulcrum or pivot point until friction or traction between pegs and the feature binds or otherwise inhibits withdrawal of pegs from the feature.

Cross member may have markings, etchings, or other indicators to assist a user with configuring frame such that the pegs will property align with the openings on feet. Etchings or markings may correspond to a size (e.g., a 50 quart ice chest) or a manufacturer, including a range (e.g., 50-75 quart ice chests).

Rotating arm a selected angle may engage pegs with the feature of the article without damaging the feature or the article in general. By maintaining the arm in a selected orientation relative to the article, the pegs may be prevented from detaching from the openings, ensuring frame remains in place. Arm may be formed, shaped, cut, or otherwise formed to provide support for the article when in use, without interfering with the use of the article. For example, in some embodiments, arm may have a lower portion having two angled pieces in which one or more of the spacing, angle, or size is selected to ensure arm does not impede access to a drain plug such as commonly found on premium ice chests.

The arm may be rotated to engage pegs with a feature of the article. In some embodiments, a length of arm may be selected for optimal mechanical advantage for engaging the pegs in the feet. In some embodiments, the arm may be formed having a height that allows the arm to pass under a handle on an end of an ice chest, foot locker, strong box, or other article. In some embodiments, the arm may be formed with an adjustable height to accommodate handles of various heights. Advantageously, embodiments may allow a user to rotate the arm until arm is substantially flush or abuts a side or end of an ice chest, thereby minimizing the overall size of the frame system and the ice chest/frame combination. An adjustable height may be accomplished using a removable extension, a retractable extension, or some other element. In some embodiments, the extension may be lockable to prevent accidental or unauthorized passage of the arm from behind the handle to prevent removal of the frame from the article. Embodiments of the arm may also be formed having a height that allows the arm to pass under the handle.

Once arm is rotated to engage pegs with feet and arm is positioned at least partially behind a handle, frame may be used to facilitate transporting an ice chest, foot locker, strong box, or other article. For example, wheels may be coupled to ends of the cross member. In some embodiments, the cross member functions as an axle and a longitudinal axis of the cross member coincides with a central axis of the wheels. In other embodiments, a longitudinal axis of the cross member is normal to a central axis of wheels, allowing wheels to operate as castors. Skis, sleds and other means for moving the article may also be attached to cross member.

Also, once arm is positioned behind a handle, frame may be secured to the article. For example, as frequently found in premium ice chests, an opening passes through the handle. In some embodiments, a locking member may pass through the opening and couple to arm including coupling to extension. In other embodiments, extension may be configured to extend through the opening. In some embodiments, a tie down bracket may be positioned in an existing notch or recess in an ice chest and a screw or other hardware may couple the tie down bracket to arm.

With frame secured to an article, frame may be used for towing, lifting, dragging, storing, or otherwise moving or manipulating the article. In some embodiments, the frame may include attachment points. The position, size, configuration or other characteristic of an attachment point may allow a user to hitch the frame to a vehicle for towing, allow a user to attach a handle for pulling, allow for straps to lift or secure the frame (and the attached article), or utilize other accessories provided by the manufacturer or third party, without modifying the original article.

DESCRIPTION OF THE PREFERRED EMBODIMENT

Embodiments disclosed herein may be useful for transporting large, bulky, or heavy articles 10 without modifying the article 10, and utilizing very little space. In the preferred embodiment, the article 10 is an ice chest 10 also known as a portable cooler 10. In this disclosure, the terms "ice chest" and "portable cooler" may be used interchangeably unless the context suggests otherwise. The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In describing the embodiments of the invention, specific terminology will be used for the sake of clarity. However, the invention is not intended to be limited to the specific terms so selected, it being understood that each specific term includes all technical equivalents operating in a similar manner to accomplish a similar purpose. It is understood that the drawings are not drawn exactly to scale. In the drawings, similar reference numbers are used for designating similar elements throughout the several drawings.

This specification and appended claims describe particular embodiments of the invention. However, it should be understood, based on this disclosure, that the invention is not limited to the embodiments detailed herein. As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases in various places throughout this specification are not necessarily all referring to the same embodiment. Furthermore, the particular features, structures, or characteristics may be combined in any suitable manner on one or more embodiments without limitation. The detailed description illustrates by way of example, not by way of limitation, the principles of the invention. This description will clearly enable one skilled in the art to make and use the invention, and describes several embodiments, aspects, adaptations, variations, alternatives, and uses of the invention, including what is presently believed to be the best mode of carrying out the invention.

The examples and illustrations of an external frame system and method for mounting are described herein with respect to mounting to an ice chest 10. However, the inventive system is equally applicable for use with other objects, devices, or articles. Moreover, while certain materials are discussed herein with respect to various components of the various embodiments, the embodiments are not limited to such materials. For example, in a preferred embodiment, certain components are formed from metal. However, as will be discussed in more detail below, the components of the device may comprise any suitable materials without departing from the scope and spirit of this disclosure.

Figure 1A:
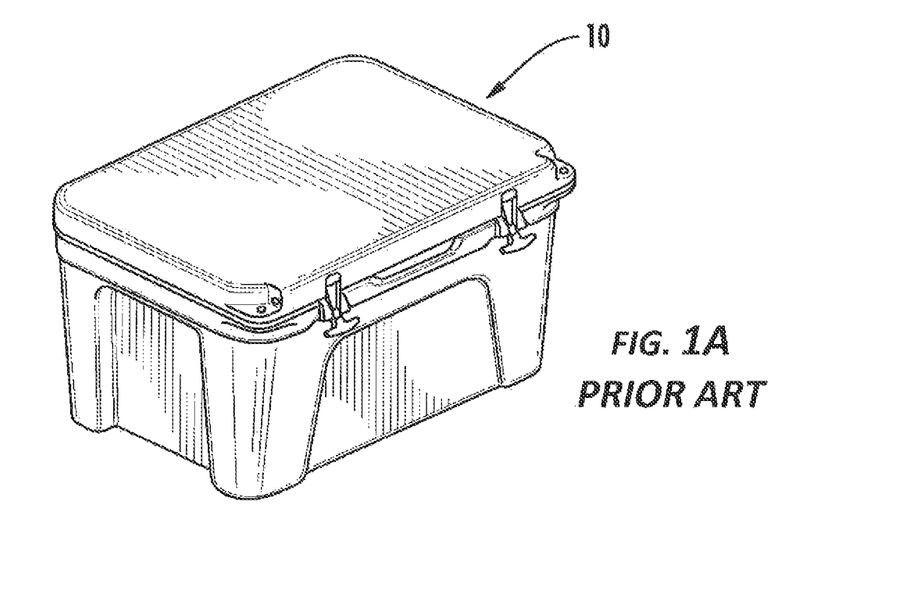
FIG. 1A is a perspective view of an exemplary prior art premium or heavy duty ice chest.
Figure 1B:
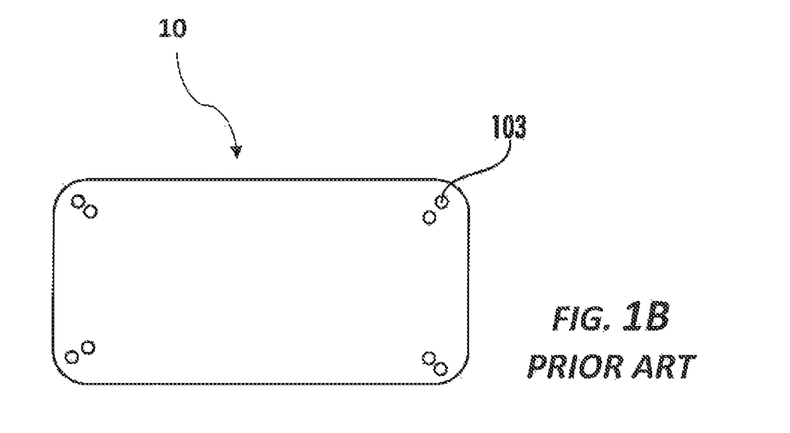
FIG. 1B is an underside elevation view of the ice chest of FIG. 1A.
Figure 4:
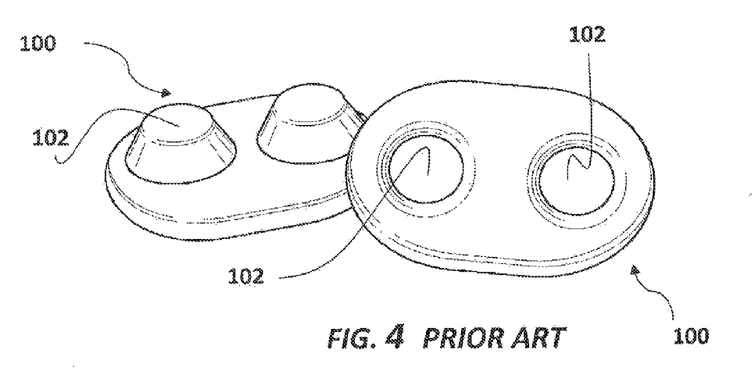
FIG. 4 are close up views of the upper and lower sides of a foot for a prior art ice chest.

Referring to FIGS. 1A and 1B, a prior art premium ice chest 10 is shown. FIG. 4 depicts a close up view of a foot 100 of an ice chest 10. Feet 100 are typically manufactured from rubber or some other pliable material and are coupled to lower ice chest openings 103 (FIG. 1B). Embodiments disclosed herein may attach to feet 100 using openings 102 in feet 100 (foot openings 102) or may be attached to the lower openings 103 in the ice chest 10 (lower ice chest openings 103). Attachment to the feet 100 of a premium ice chest 10 or the lower ice chest openings 103 may not require drilling into the ice chest 10 or otherwise modifying the ice chest 10 such that the warranty is invalidated or the functionality of the ice chest 10 affected. The inside dimensions of foot openings 102 may vary. An inner diameter may be from 15-20 mm and a depth may be between 20-30 mm. For example, an inside diameter of a foot 100 found on YETI brand coolers is about 18 mm and the depth is about 24 mm.

Figure 5:
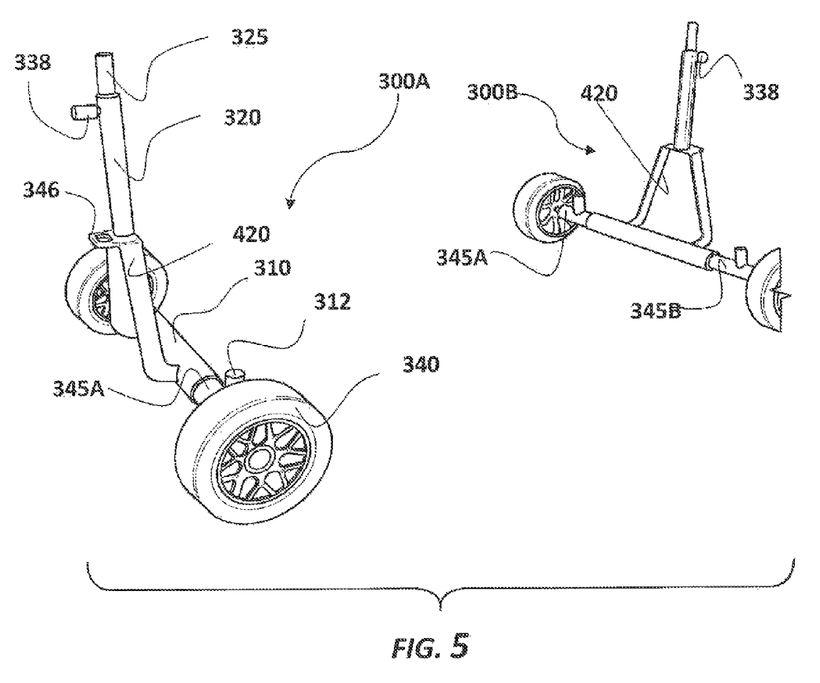
FIG. 5 is a perspective view of a portion of the frame system, in accordance with a preferred embodiment.

FIG. 5 depicts a perspective view of one embodiment of a frame system 300A, 300B for removable coupling to an ice chest 10, foot locker 10, or other article 10 having a selected feature. The frame system 300A, 300B of the preferred embodiment comprises a first assembly 300A and a second assembly 300B, each assembly 300A, 300B comprising a frame 300. Although the frame system 300A, 300B of the preferred embodiment comprises first and second assemblies 300A, 300B, the system 300A, 300B may include only one assembly 300A, 300B, for example, only the first assembly 300A. Frame 300 may include cross member 310, pegs 312, one or more offset members 345A, 346B and arm 320. In some embodiments, frame 300 may further include wheels 340, extension 325, and/or attachment points 346. In the preferred embodiment, the arm 320 comprises a bracket 420 and is attached to the crosspiece 310.

Referring to FIGS. 2A-3C, in preferred embodiments, cross member 310 comprises an elongated cylinder 345 spanning between wheels 340. As shown, for example, in FIGS. 3A-3B and 5, in one embodiment, cross member 310 has an adjustable length. Cylinder 345 comprises cylinder first and second ends 311, 313. Nested within and extending from the cylinder first end 311 is a first offset member 345A. Nested within and extending from cylinder second end 311 is a second offset member 345B. First and second offset members 345A, 345B of the preferred embodiment are cylindrical and are each coaxially nested within the cylinder 346. Alignment openings 317 in the cylinder 345 and offset members 345A, 345B permit the positions of the offset members 345A, 345B to be adjusted such that the length of cross member 310 may be changed. Alignment pins 319 may be inserted into cross member openings 317 and offset member openings 317 to secure the offset members 345A, 345B in a desired position, such that, for example, the position of pegs 312 on cross member 310 may be varied to align with the features on the article 10.

Figures 2A, 2B:
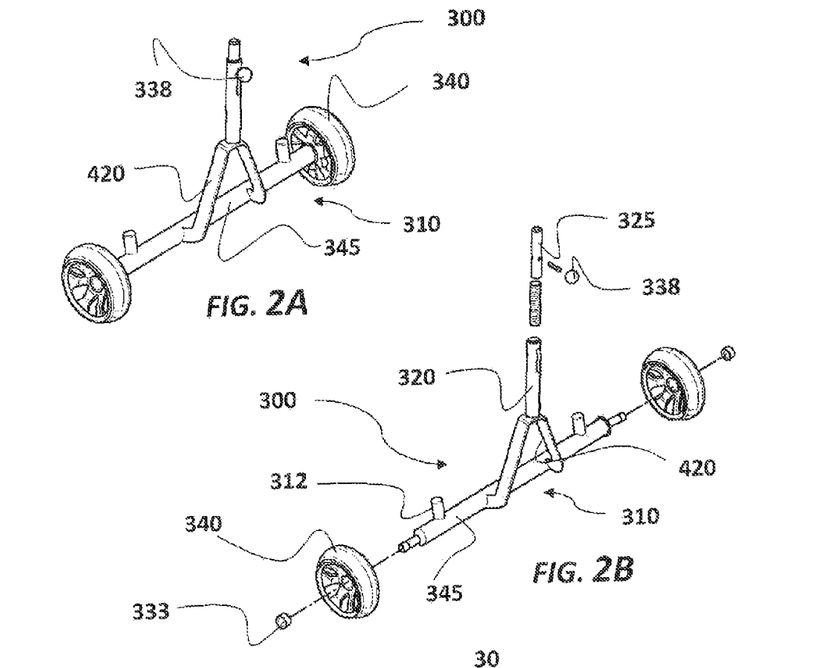
FIG. 2A is a perspective view of a frame of a preferred embodiment.
FIGS. 2B and 2C are exploded views of the frame of FIG. 2A.
Figure 2C:
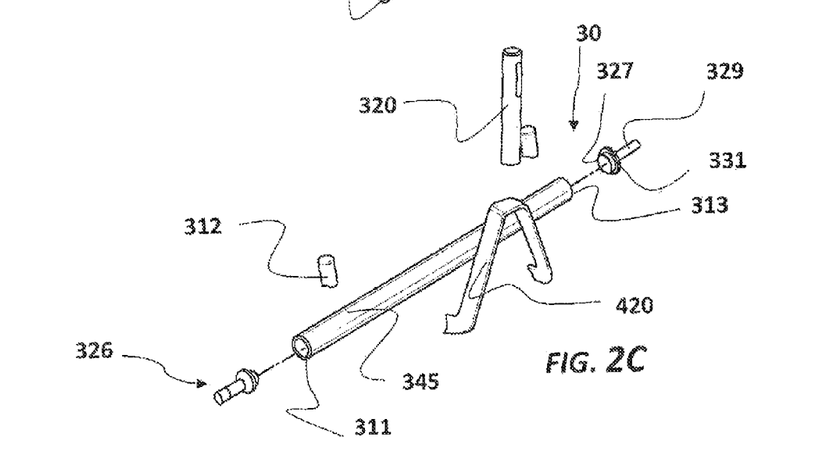

As best shown in FIG. 2C, cross member 310 comprises first and second cross member ends 321, 323. Attached to each cross member end 321, 323 is an axle assembly 326. In the preferred embodiment, each axle assembly 326 comprises a coupling member 327, a bushing 331, and an axle 329. Coupling member 327 of the preferred embodiment is structured and arranged to fit within the cross member end 321, 323 such that bushings 331 cap the respective cross member ends 321, 323. However, coupling member 327 may be coupled with cross member 310 in other ways known in the art. For example, but not by limitation, coupling member 327 may be welded flush with cross member 310, welded to an inner or outer surface of cross member 310, or frictionally coupled to an inner or outer surface of cross member 310. When axle assembly 326 is so positioned, axle 329 extends coaxially from the respective cross member end 321, 323. Axle 329 of the preferred embodiment is adapted to receive a fastener such as nut 333. Wheel 340 may be threaded over axle 329 and secured against bushing 331 by threaded nut 333. Other ways of securing wheel 340 to cross member 310 well known in the art may be used without departing from the scope and spirit of this disclosure.

Cross member 310 may be manufactured from various materials. Marine grade stainless steel may be advantageous for contact with harsh elements and further be able to support a fully loaded ice chest 10. Other materials are possible. Although in the preferred embodiment cross member 310 comprises a nested cylinder arrangement, cross member 310 may have any cross-section, including solid or hollow and may be formed from a single length of material (FIGS. 2A-2C) rather than separate adjustable portions (offset members 345A, 345B). Thus, in some embodiments, cross member 310 is manufactured having a set length and pegs 312 are permanently affixed to cross member 310 in predetermined locations to align with features on the article 10. In some embodiments, a cross section of cross member 310 may be substantially square or otherwise angular. As mentioned, in other embodiments, a cross section of cross member 310 may be substantially circular or otherwise curved. In some embodiments, cross member 310 may further function as an axle 329 without a separate axle assembly 326.

Figure 6:
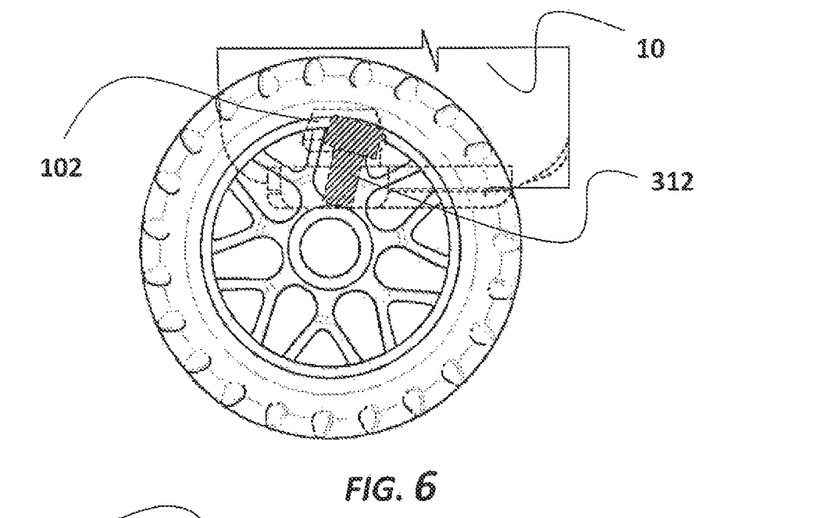
FIG. 6 is a partial cutaway and side elevation view of the frame attached to an ice chest, in accordance with a preferred embodiment.
Figure 7:
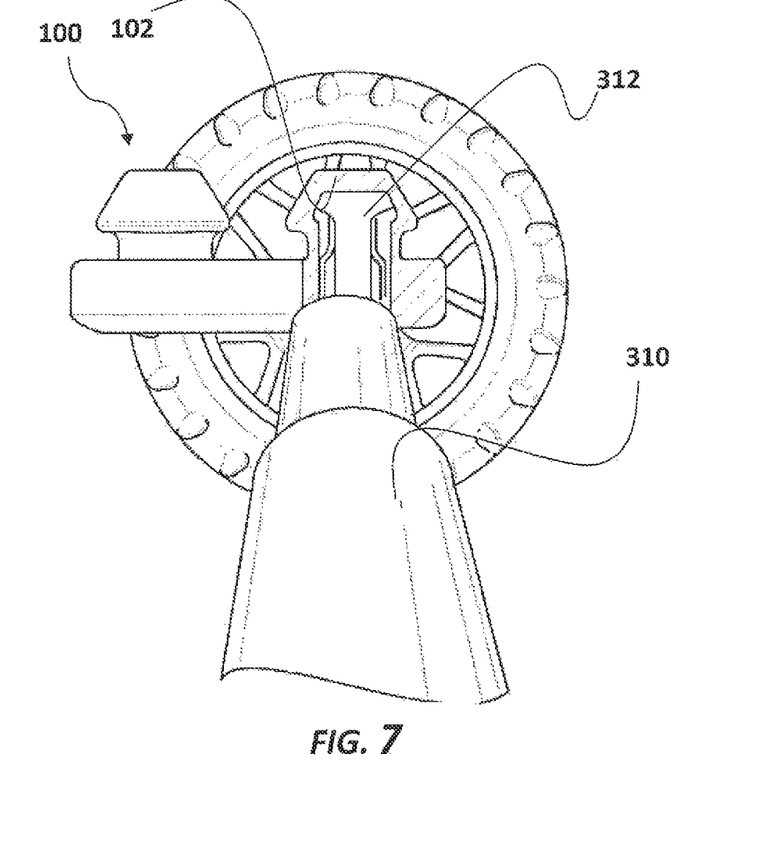
FIG. 7 is a partial cutaway and perspective view of a foot portion, cross member, and wheel, in accordance with a preferred embodiment.
Figure 8:
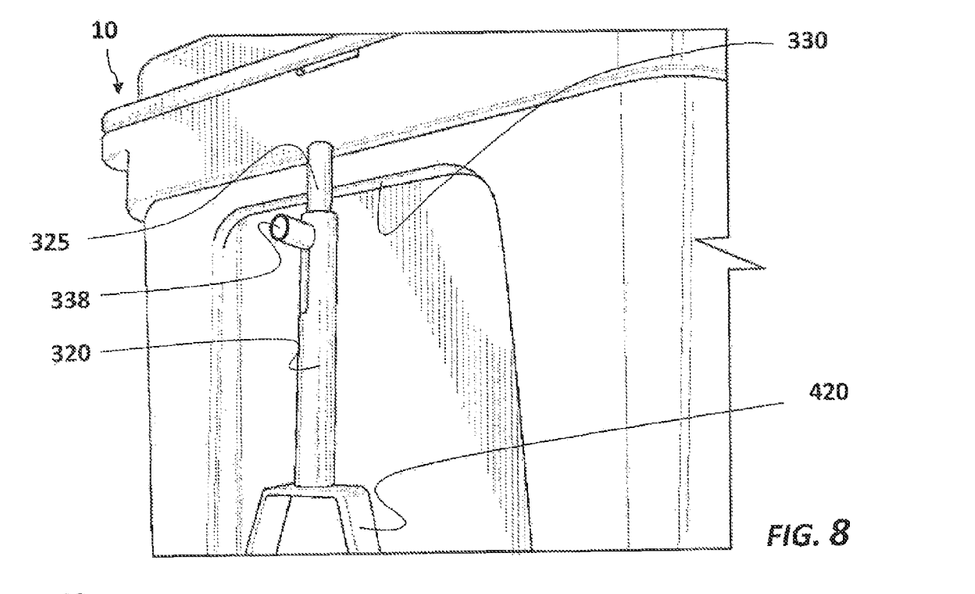
FIG. 8 is a perspective view of the arm and extension member of the frame, in accordance with a preferred embodiment.
Figure 9:
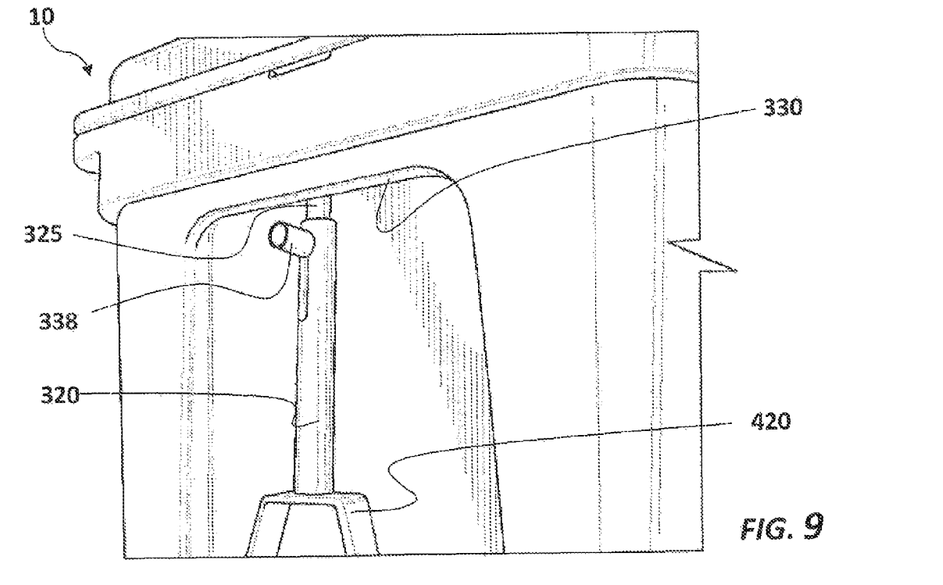
FIG. 9 is a perspective view of the arm and extension member of FIG. 8, with the arm and extension member positioned within an ice chest handle opening, in accordance with a preferred embodiment.

Referring to FIGS. 5, 6 and 7, pegs 312 on cross member 312 may be useful for engaging feet 100 on the ice chest 10. The shape and size of pegs 312 may be selected for engaging the feature of the article 10 without damage to the article 10 or modification to the article 10. Pegs 312 may be cast, molded, cut, shaped, or otherwise formed for contact with features of the article 10. In some embodiments, pegs 312 are formed for contact with features, such as foot openings 102 commonly found on premium ice chests 10. Pegs 312 may have various profiles or cross-sections for contact. In some embodiments, pegs 312 may have a uniform cross section or profile, or may be substantially uniform with a taper or knurl. In other embodiments, pegs 312 may have a directional cross section. For example, pegs 312 may have a shoulder 315A or other feature for contact with an edge of foot openings 102, a head 414 for contact with material inside foot openings 102, and may be angled or tapered to avoid contact or to provide specific contact with other portions of material inside foot openings 102. FIG. 7 depicts a cutaway view of one embodiment of frame 300 with peg 312 having shoulder 315A and further depicting a possible shoulder profile 316B. Other cross sections are possible. The size of pegs 312 may also selected based on the geometry of pegs 312 or the shape or depth of the feature on the article 10. FIGS. 6 and 7 are cutaway views depicting one embodiment of peg 312 positioned in a foot 100 commonly found on premium ice chest 10, foot lockers, and the like. In one embodiment, pegs 312 for use with a foot opening 102 having a diameter of about 18 mm and a depth of about 24 mm may extend approximately 1.5 inches from a longitudinal axis of cross member 310. An outermost feature for contact with a feature may be about 0.7 inches long and about 0.2 inches wide. An outermost feature may be curved. In one embodiment, the curvature for the outermost end of peg 312 may be approximately a one inch radius. A shoulder portion 315A may extend at least about 0.7 inches from the longitudinal axis of cross member 310. The dimensions may vary depending on the diameter or width of cross member 310.

Cross member 310 having pegs 312 extending radially therefrom may be advanced into foot openings 102. Pegs 312 may engage the features on an article 10 to secure frame 300 to the article 10. For example, embodiments may utilize foot openings 102 as pivot points to create friction in the cavity. One method of engaging pegs 312 with the features of the article 10 includes rotating cross member 310 about a longitudinal axis utilizing the edge of foot opening 102 as a fulcrum or pivot point until friction or traction between pegs 312 and the feature binds or otherwise inhibits withdrawal of pegs 312 from the feature.

Figure 3A:
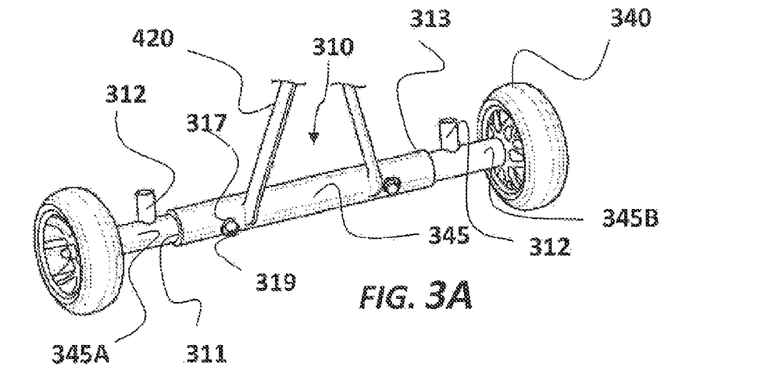
FIG. 3A is a front perspective view of a portion of the frame in accordance with another embodiment.
Figure 3B:
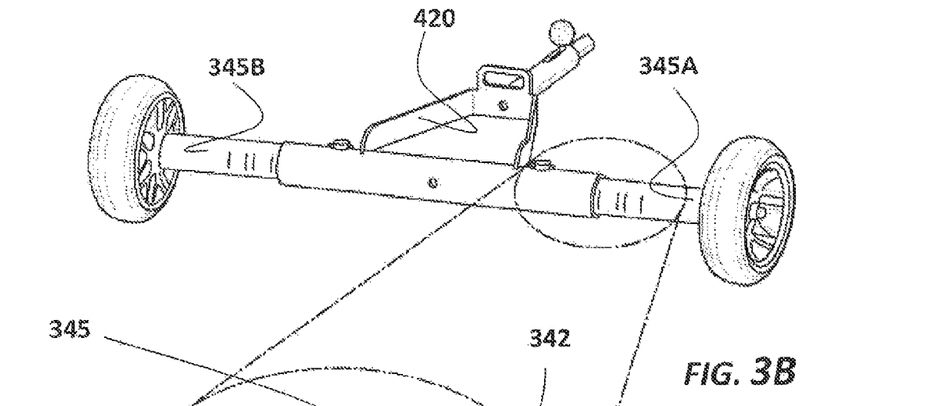
FIG. 3B is a side perspective view of the frame of FIG. 3A.
Figure 3C:
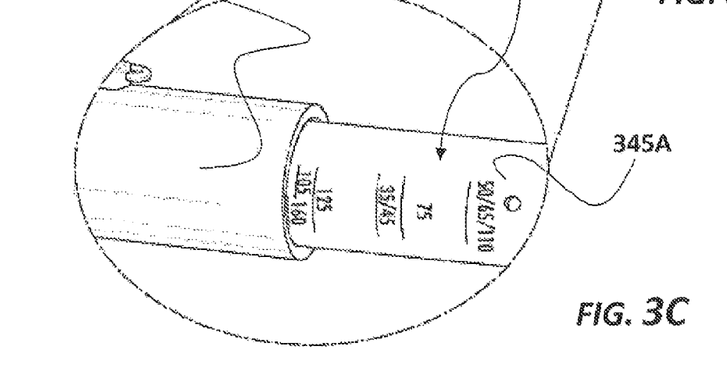
FIG. 3C is a close up view of markings on the frame of FIGS. 3A and 3B.

Referring to FIGS. 3B and 3C, cross member 310 may have markings 342, etchings 342, or other indicators 342 to assist a user with configuring frame 300 such that pegs 312 will properly align with foot openings 102. Etchings 342 or markings 342 may correspond to a size (e.g., a 50 quart ice chest 10) or a manufacturer, including a range (e.g., 50-75 quart ice chests 10).

Rotating arm 320 a selected angle may engage pegs 312 with the feature of the article 10 without damaging the feature or the article 10 in general. In some embodiments, an angle between arm 320 and pegs 312 is between 10-30 degrees such that rotation of arm 320 engages pegs 312 in foot openings 102. By maintaining arm 320 in a selected orientation relative to the article 10, pegs 312 may be prevented from detaching from foot openings 102, ensuring frame 300 remains in place. Arm 320 may be formed, shaped, cut, or otherwise formed to provide support for the article 10 when in use, without interfering with the use of the article 10. For example, in some embodiments, arm 320 may comprise the bracket 420 comprising two angled pieces 420A, 420B in which one or more of the spacing, angle, or size is selected to ensure arm 320 does not impede access to a drain plug such as commonly found on premium ice chest 10.

Arm 320 may be rotated to engage pegs 312 with a feature of the article 10. However, the position, depth or some other characteristic of a feature on the article 10 may affect engagement. For example, the distance between a foot 100 and the sides of the ice chest 10 varies among manufacturers of premium ice chests 10. Accommodating for different distances may include modifying one or more of the length of offset members 345A, 348B, the size of cross member 310, the shape and size of pegs 312, and the configuration of arm 320. A perspective view of one embodiment of frame 300 includes offset members 345A, 345B. Embodiments of frame 300 having offset members 345A, 346B with lengths based, at least in part, on the distance between a foot 100 and the end or sides of an ice chest 10 desired for use may provide sufficient spacing to allow pegs 312 to securely engage feet of the ice chest 10 without damaging the ice chest 10 or requiring modification of the ice chest 10.

As mentioned above, rotating arm 320 a selected angle may engage pegs 312 with a feature on the article 10. In some embodiments, a length of arm 320 may be selected for optimal mechanical advantage for engaging pegs 312 in feet 100. In some embodiments, arm 320 may be formed having a height that allows arm 320 to pass under a handle 328 on an end of an ice chest 10, foot locker 10, strong box 10, or other article 10. In some embodiments, arm 320 may be formed with an adjustable height to accommodate handles 328 of various heights. Advantageously, embodiments may allow a user to rotate arm 320 until arm 320 is substantially flush or abuts a side or end of an ice chest 10, thereby minimizing the overall size of the frame system and the ice chest/frame combination. An adjustable height may be accomplished using a removable extension 325, a retractable extension 325, or some other element. FIGS. 4A and 4B depict views of one embodiment of arm 320 having extension 325 which can be removed or retracted to allow arm 320 to pass under an ice chest handle 328 (such as depicted in FIG. 4A), then extended to retain arm 320 behind the ice chest handle 328 (such as depicted in FIG. 4B). In some embodiments, extension 325 may be moved into a desired position by use of grasping portion 338, as shown for example in FIGS. 2A, 2B, 8-11. In some embodiments, extension 325 may be lockable to prevent accidental or unauthorized passage of arm 320 from behind ice chest handle 328 to prevent removal of frame 300 from the article 10. Embodiments of arm 320 may also be formed having a height that allows arm 320 to pass under the ice chest handle 328.

Once arm 320 is rotated to engage pegs 312 with feet 100 and arm 320 is positioned at least partially behind the ice chest handle 328, frame 300 may be used to facilitate transporting an ice chest 10, foot locker, strong box, or other article 10. For example, wheels 340 depicted in FIG. 5 may be coupled to ends of cross member 310. In some embodiments, cross member 310 functions as an axle and a longitudinal axis of cross member 310 coincides with a central axis of wheels 340. In other embodiments, a longitudinal axis of cross member 310 is normal to a central axis of wheels 340, allowing wheels 340 to operate as castors. Skis, sleds and other means for moving the article 10 may also be attached to cross member 310.

Figures 10, 11, 12:
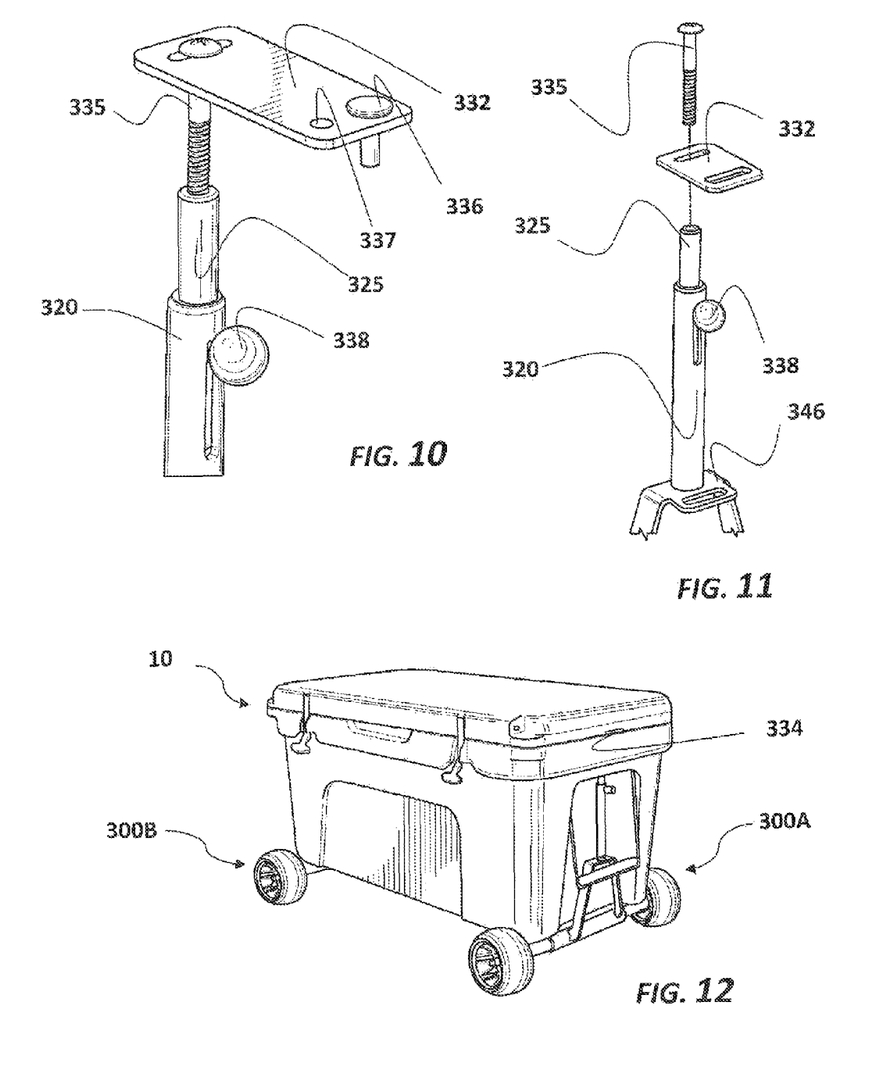
FIG. 10 is a perspective view of an arm and extension member, with a tie down bracket coupled to the upper end, in accordance with another embodiment.
FIG. 11 is a partially exploded view of an arm, extension member, and a tie down bracket in accordance with another embodiment.
FIG. 12 is a perspective view of the frame system of FIG. 5 attached to the ice chest of FIG. 1, in accordance with a preferred embodiment.
Figures 13A, 13B, 13C, 14A:
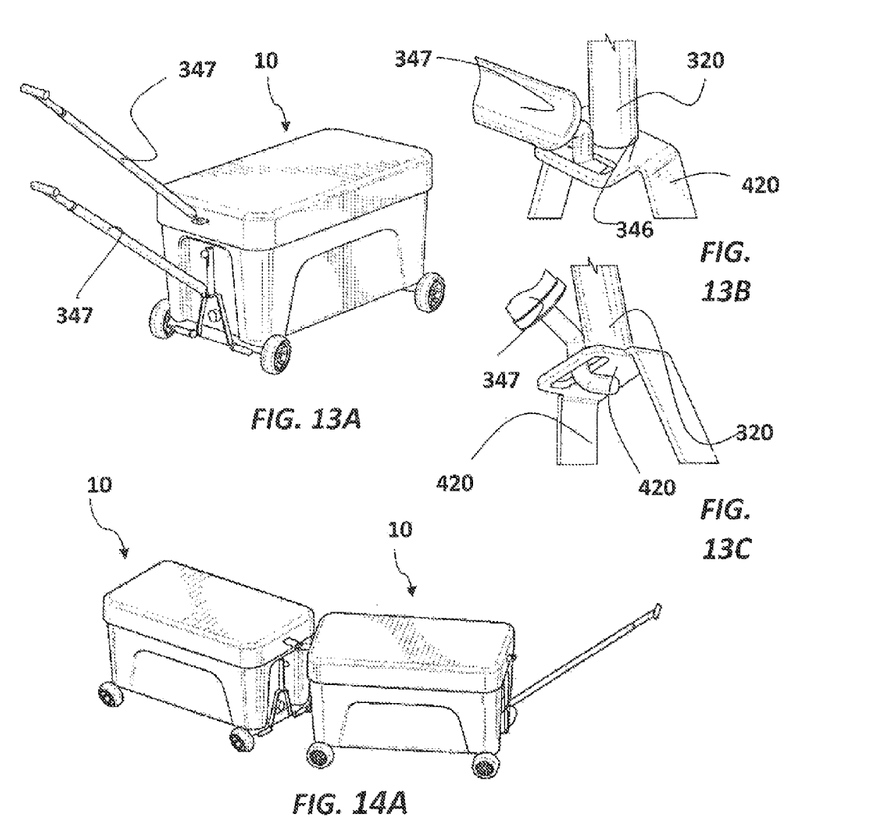
FIG. 13A is a perspective view of the frame attached to an ice chest with handles shown in alternative positions.
FIG. 13B is a close-up view of the upper side of the lower pull handle attachment juncture of FIG. 13A.
FIG. 13C is a close-up view of the lower side of the lower pull handle attachment juncture of FIG. 13A.
FIG. 14A is a perspective view of the frame system of a preferred embodiment attached to two ice chests coupled together.
Figure 14B:
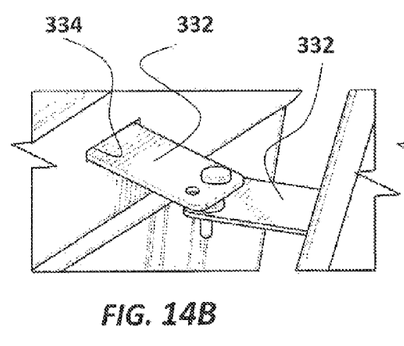
FIG. 14B is a close-up upper view of the tie down bracket juncture between to the two ice chests of FIG. 14A.
Figure 14C:
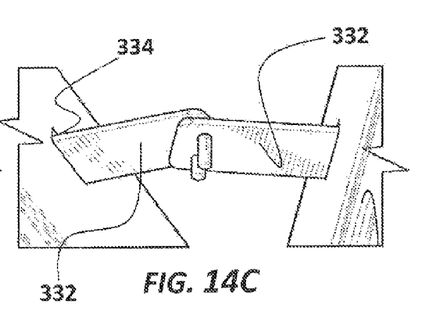
FIG. 14C is a close-up lower view of the tie down bracket juncture between to the two ice chest of FIG. 14A.

Also, once arm 320 is positioned behind ice chest handle 328, frame 300 may be secured to the article 10. For example, as frequently found in premium ice chests 10, an ice chest handle opening 330 passes through the ice chest handle 328. In some embodiments, a locking member may pass through the ice chest handle opening 330 and couple to arm 320 including coupling to extension 325. In other embodiments, extension 325 may be configured to extend through the ice chest handle opening 330. Referring to FIGS. 10 & 11, in some embodiments, a tie down bracket 332 may be positioned in an existing notch 334 (FIG. 10) or recess 334 in an ice chest 10 and a screw 335 or other hardware may couple the tie down bracket 332 to arm 320. A pin 336 may be inserted into a tie down bracket opening 337 so that, for example, the tie down bracket 332 may be coupled to another tie down bracket 332 as shown in FIGS. 14A-14C.

With frame 300 secured to the article 10, frame 300 may be used for towing, lifting, dragging, storing, or otherwise moving or manipulating the article 10. In some embodiments, frame 320 may include attachment points 346. FIG. 12 depicts a perspective view of an ice chest 10 with frames 300 installed on both ends. The position, size, configuration or other characteristic of an attachment point 346 may allow a user to hitch frame 300 to a vehicle for towing, allow a user to attach a pull handle 347 for pulling, allow for straps to lift or secure frame 300 (and the attached article 10), or utilize other accessories provided by the manufacturer or third party, without modifying the original article 10.

The features are described as they pertain to a single frame positionable on either end of an ice chest 10. Those skilled in the art will appreciate that the description may apply to a system of frames located on both ends, on either side, or both sides of an ice chest 10, foot locker 10, strong box 10, or the like.

Additional aspects and example embodiments are described in the attached Appendices A-C, which are incorporated herein in their entirety. Specifically, Appendices A-C describe implementations of a frame system including features and variations thereof.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

The foregoing disclosure and showings made in the drawing are merely illustrative of the principles of this invention and are not to be interpreted in a limiting sense. While the invention is shown in only a few forms, it is not just limited to the forms shown, but is susceptible to various changes and modifications without departing from the spirit thereof. The foregoing description of a preferred embodiment of the invention has been presented for the purpose of illustration and description. It is not intended to be exhaustive or to limit the invention to the precise form disclosed. Obvious modifications or variations are possible in light of the above teachings. The invention may be adapted for use in a number of environments.

The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention in accordance with the breadth of this disclosure and the claims, to which it is fairly, legally, and equitably entitled to be interpreted.

I claim:

1. A frame for attachment to an article, the frame comprising:
   a crosspiece and an arm;
   the crosspiece being coupled to the arm and comprising one or more pegs;
   said one or more pegs extending radially from the crosspiece and being structured and arranged for insertion within a first opening of the article;
   said arm comprising a distal end structured and arranged for insertion within a second opening of the article;
   the frame comprising one or more transport members, said one or more transport members being adapted to permit the article and frame to be moved when the frame is attached to the article.

2. The frame of claim 1, the one or more transport members comprising wheels.

3. The frame of claim 2, the crosspiece comprising a crosspiece length, the length being adjustable.

4. The frame of claim 3, the arm comprising an arm length, the arm length being adjustable.

5. The frame of claim 4, the one or more pegs being adapted for insertion within foot openings of the article.

6. The frame of claim 5, the arm further comprising a bracket, the bracket being coupled to the crosspiece and angling outward from the crosspiece.

7. The frame of claim 6, arm further comprising an accessory coupling portion.

8. The frame of claim 7, the accessory coupling portion being adapted for coupling a handle.

9. The frame of claim 7, the accessory coupling portion being adapted for coupling with a second accessory coupling portion of a second frame.

10. In combination, a frame attachment apparatus and a portable cooler comprising:
    front and rear frames, said frames each comprising a crosspiece and an arm;
    the portable cooler comprising foot openings and handle openings, the foot openings being positioned on a lower outside surface of the cooler, the handle openings being positioned on sides of the portable cooler;
    the crosspieces each comprising one or more pegs;
    the front frame crosspiece being coupled to the front frame arm and the rear frame crosspiece being coupled to the rear frame arm;
    said one or more pegs being structured and arranged for insertion within the foot openings;
    each of said arms comprising a distal end structured and arranged for insertion within the handle openings;
    each of said crosspieces and arms being adjustable in length;
    each of said crosspieces comprising wheels.

11. The frame attachment apparatus and portable cooler of claim 10, each of the arms further comprising a bracket, the bracket being coupled to the crosspiece and angling outward from the crosspiece.

12. The frame attachment apparatus and portable cooler of claim 10, each of the arms further comprising an accessory coupling portion.

13. The frame attachment apparatus and portable cooler of claim 12, the accessory coupling portions each being adapted for coupling a handle.

14. The frame attachment apparatus and portable cooler of claim 12, the accessory coupling portions each being adapted for coupling with a accessory coupling portions of a second frame attachment apparatus.

15. A method of mounting a frame to a portable cooler, comprising the steps of:
- providing a frame and a portable cooler, the frame comprising a crosspiece coupled to an arm, the arm comprising one or more pegs, the portable cooler comprising foot member openings and handle openings;
- inserting an insertion member into one of said member openings;
- inserting said arm in one of said handle openings; and
- securing said arm within the one of said handle openings.

16. The method of claim 15, the frame comprising one or more transport members, said one or more transport members being adapted to permit the portable cooler and frame to be moved when the frame is attached to the portable cooler.

17. The method of claim 15, the crosspiece comprising a crosspiece length, the length being adjustable.

18. The method of claim 15, the arm comprising an arm length, the arm length being adjustable.

19. The method of claim 15, the arm further comprising a bracket, the bracket being coupled to the crosspiece and angling outward from the crosspiece.

20. The method of claim 15, arm further comprising an accessory coupling portion.

21. The method of claim 15, the accessory coupling portion being adapted for coupling a handle.

22. The method of claim 15, the accessory coupling portion being adapted for coupling with a second accessory coupling portion of a second frame.

* * * * *